Patented Oct. 7, 1941

2,258,390

UNITED STATES PATENT OFFICE 2,258,390

LARVACIDE AND PROCESS FOR PREPARING SAME

Walter D. Martin, Albany, Ga.

No Drawing. Application March 6, 1940, Serial No. 322,621

5 Claims. (Cl. 167—43)

This invention relates to larvacides, and has special reference to buoyant larvacides adapted to float upon a water surface.

More particularly the invention relates to the character of larvacides set forth in my prior application for patent for Larvacide and process for preparing same, filed March 27, 1939, Serial No. 264,493, allowed October 2, 1939, the present application being a continuation in part of the foregoing.

One important object of the invention is to provide a novel, solid and buoyant larvacide composition composed in part of toxic agents and in part of water soluble substances, whereby, upon distributing the composition on water, the water soluble part of the composition will dissolve and the toxic agents be freed.

A second important object of the invention is to provide a novel larvacide of the class described, wherein the composition contains one or more ingredients effecting spreading of the toxic agents in a film upon the larvacide being distributed on a water surface.

A third important object of the invention is to provide a novel composition of this character which will effectively cover the surface of a body of water to which it is applied so that larvae bred in the water cannot issue therefrom without coming in contact with the toxic agents contained in the composition.

A fourth important object of the invention is to provide a novel larvacide composition consisting in part of oil and in part of toxic agents, the mixture being of such character as to provide a water borne film having an upper layer of oil and a lower layer of toxic agents upon the composition being sprinkled on a water surface.

A fifth important object of the invention is to provide a novel method of manufacturing such a larvacide.

A sixth important object of the invention is to provide a novel method of preparing a larvacide of the character set forth whereby the composition is freed from undesirable bituminous matter.

With the above and other objects in view, as will be presently apparent, the invention consists in general of a novel composition of matter forming a larvacide and a novel method of forming such a composition.

It is possible to make several different forms of larvacides in accordance with the present invention, as well as compound the compositions set forth in several manners quite within the scope of this invention. Accordingly, there now follows examples of compositions conforming to this invention and substantially the proportions thereof:

Example I

| | Parts |
|---|---|
| Pine rosin | 400 |
| Sodium hydroxide | 100 |
| Kerosene | 1,000 |
| Water gas tar | 250 |
| Motor oil | 250 |
| Castor oil | 1 |
| Water, about | 50 |

Example II

| | |
|---|---|
| Pine rosin | 400 |
| Sodium hydroxide | 100 |
| Kerosene | 1,000 |
| Tar acid oil | 250 |
| Bunker C gas oil | 250 |
| Castor oil | 1 |
| Water, about | 50 |

Example III

| | |
|---|---|
| Pine rosin | 400 |
| Sodium hydroxide | 100 |
| Kerosene | 1,000 |
| Light creosote oil | 250 |
| Motor oil | 250 |
| Castor oil | 1 |
| Water, about | 50 |

Example IV

| | | |
|---|---|---|
| Pine rosin | pounds | 400 |
| Sodium hydroxide | do | 125 |
| Water | do | 125 |
| Water gas tar oil | pints | 1000 |
| Kerosene | do | 500 |
| Tar acid oil | do | 250 |

Example V

| | | |
|---|---|---|
| Pine rosin | grams | 400 |
| Sodium hydroxide | do | 100 to 125 |
| Fuel oil | cubic centimeters | 1000 |
| Water gas tar oil | do | 250 |
| Tar acid oil | do | 250 |
| Water | do | 50 to 125 |

Example VI

| | | |
|---|---|---|
| Pine rosin | grams | 400 |
| Sodium hydroxide | do | 100 to 125 |
| Crude oil | cubic centimeters | 1000 |
| Tar acid oil | do | 250 |
| Water gas tar oil | do | 250 |
| Water | do | 50 to 125 |

Example VII

| | | |
|---|---|---|
| Pine rosin | grams | 400 |
| Sodium hydroxide | do | 100 to 125 |
| Gas oil | cubic centimeters | 1000 |
| Tar acid oil | do | 250 |
| Water gas tar oil | do | 250 |
| Water | do | 50 to 100 |

Example VIII

| | | |
|---|---|---|
| Motor oil (new or crank case) cubic centimeters | | 1000 |
| Pine rosin | grams | 400 |
| Sodium hydroxide | do | 100 to 125 |
| Tar acid oil | cubic centimeters | 250 |
| Water gas tar oil | do | 250 |
| Water | do | 50 to 125 |

Example IX

| | | |
|---|---|---|
| Pine rosin | grams | 400 |
| Sodium hydroxide | do | 100 to 125 |
| Bunker C oil | cubic centimeters | 1000 |
| Tar acid oil | do | 250 |
| Water gas tar oil | do | 250 |
| Water | do | 50 |

Example X

| | | |
|---|---|---|
| Pine rosin | grams | 400 |
| Sodium hydroxide | do | 100 to 125 |
| Solvent or mineral spirits | cubic centimeters | 1000 |
| Tar acid oil | do | 250 |
| Water gas tar oil | do | 250 |
| Water | do | 50 to 100 |

It will be observed that the pine rosin and sodium hydroxide combine to form a rosin soap. Furthermore, the kerosene of the first four examples may be replaced by one of the group comprising fuel oil, crude oil, gas oil, motor oil, bunker C oil, and solvent or mineral spirits. In each case, the content of the selected group member will equal 1,000 parts by weight, as compared with substantially half the quantity of rosin soap and substantially half the quantity of the other ingredients.

Furthermore, about one-fourth of the composition is selected from the group comprising water gas tar, motor oil, tar acid oil, bunker C oil and light creosote oil, equal parts of two of these entering the composition. It will be noted that the selections from the group are combined in a state of partial emulsification.

It was mentioned above that the sodium hydroxide combines with the pine rosin to form a rosin soap. It has been found that other sodium derivatives may be combined with the rosin to form rosin soap and it is to be understood that sodium carbonate and sal soda may be used in place of the hydroxide.

As an example of the manner of producing the composition, Example IV will be particularly considered. In this example the preparation is as follows:

*First.*—Melt the pine rosin to very high heat.

*Second.*—Mix the water gas tar oil, kerosene and tar acid oil and heat to fairly hot (slight boiling).

*Third.*—Dissolve the sodium hydroxide in the water, and thoroughly dissolve the sodium hydroxide.

*Fourth.*—Add the hot pine rosin to the heated mixture of oils and tars.

*Fifth.*—Slowly add the sodium hydroxide solution to the pine rosin and oil and tar mix. As the sodium hydroxide solution is added slowly, the entire mix is agitated, as the chemical union takes place, which is very rapidly. Agitation is continued until the mass becomes completely solidified into round and irregular shaped granules ranging in size from that of shot to pieces the size of peas or larger.

In order to obtain the water gas tar oil, the following procedure is had:

Equal parts of kerosene and water gas tar are mixed and heated; when the mass becomes hot, the bitumen present in the gas tar will precipitate to the bottom and can be removed as solid material. The kerosene and the kerosene soluble part of the gas tar is called water gas tar oil.

25% of the water gas tar will be precipitated as solid bitumen and 75% of the water gas tar will be dissolved into the kerosene and remain a perfectly thin liquid. The part that is soluble in the kerosene carries all of the mosquito larva toxics. In other words, if one gallon of water gas tar and one gallon of kerosene is mixed and heated, then about two pounds of bitumen will be precipitated to the bottom and may be removed as solid and brittle bitumen, leaving 1¾ gallons of the water gas tar oil.

High grade fuel oil or crude oil may be substituted for kerosene and the same results attained. However, none of the other substitutes will throw the bitumen out.

Care must be taken to so proportion the amount of sodium hydroxide, which varies in strength in the ordinary commercial product, that a complete solidification of the mass will occur while the oils and tar are but partially emulsified.

The foregoing process produces a rosin soap containing partially emulsified oils and tar.

The foregoing provides an effective larvacide which has a number of new and important qualities and forms means to effect the control of larvae, particularly the larvae of fleas, flies and mosquitoes, which has not been possible under methods now prevailing.

The new product can be made in a solid, flake, or granular form and readily floats. It is readily soluble in water but not too quickly soluble and as the material goes into solution, it spreads itself about on the surface, giving off a highly toxic film, the toxicity of which is derived from the ingredients incorporated in the material. This breaking down in solution is not an instantaneous one, but is in direct ratio to the mass of the material used.

The toxicity or killing power is the result of two definite effects:

(1) It spreads an oily film on the surface of the water and as the larvae emerge from the depths in an effort to breathe, the oily film clogs their breathing tubes and has a suffocating effect.

(2) Just under the oily film are the highly toxic portions which have the effect of saturating the larvae in the bath of highly toxic material, thus killing the larvae by contact.

It is not necessary to bring the complete body of water up to a killing solution as it is not like most emulsions and most types of larvacides. One of the chief qualities is the partially emulsified toxic material floating just below the oily film. The material is so activated by its process of incorporation that when molded into a cake of various sizes, then suspended in a flowing stream, it will give off a sufficient quantity of killing film to effectively control the entire area of the water surface, thus making it unnecessary to operate or treat the whole length of the water surface.

The high efficiency with which the material can be handled is a very important part in its manufacture and use. By the manufacturing of a floating solid material, it can be made into any strength of solution required for the treatment of any type of larvae. Great saving is effected in the ability to use the material without the necessity of specialized equipment. It is, for instance, possible to treat large areas of water for mosquito larvae by the scattering of pieces or cakes of material in the size predetermined that will dissolve and spread themselves about over the water and distribute on the surface the necessary film, thus eliminating the necessity of sprayers or tanks in such types of work.

In the treatment of flea larvae, the procedure will be to thoroughly wet down with an ordinary hose or sprinkler the breeding place of the fleas, which is always in a dry and dusty place, to the depth of at least 1½ inches. The larvacide is then diluted in water to whatever strength desired and sprayed with a sprayer or sprinkled with a sprinkling can over the surface of the ground so dampened. Its control is very immediate and positive in its effect.

For the treatment of fly larvae, the material is dissolved in water to the strength desired and sprinkled over the surface of the breeding place of the fly which is usually moist and damp.

The material may also be used for other types of larvae and may be used as a spray on dormant vegetation and the treatment of ant hills.

It will be noted that due to the peculiar character of this larvacide, it will float on the surface of water and at the same time will distribute itself due to its mobile qualities over such surface.

I claim:

1. A larvacidal composition comprising a rosin soap impregnated with kerosene; at least one of the group consisting of water gas tar, tar acid oil and light creosote oil; at least one of the group consisting of motor oil and bunker C gas oil, the selections from the groups being combined in a state of partial emulsification; and with castor oil.

2. A larvacidal composition comprising a rosin soap impregnated with kerosene; at least one of the group consisting of water gas tar, tar acid oil and light creosote oil; at least one of the group consisting of motor oil and bunker C gas oil, the selections from the groups being combined in a state of partial emulsification; and with castor oil, wherein the quantity of kerosene by weight equals substantially the combined quantities of the remaining ingredients, the same being floatable and having mobile qualities.

3. A larvacidal composition comprising a rosin soap impregnated with kerosene; at least one of the group consisting of water gas tar, tar acid oil and light creosote oil; at least one of the group consisting of motor oil and bunker C gas oil, the selections from the groups being combined in a state of partial emulsification; and with castor oil, wherein the proportions by weight are:

| | Parts |
|---|---|
| Rosin soap | 550 |
| Kerosene | 1000 |
| The derivative of the first group | 250 |
| The derivative of the second group | 250 |
| Castor oil | 1 |

4. A larvacidal composition formed by mixing by weight

| | Parts |
|---|---|
| Pine rosin | 400 |
| Sodium hydroxide combined to form a rosin soap | 100 |
| Kerosene | 1000 |
| At least one of a group consisting of water gas tar, tar acid oil and light creosote oil | 250 |
| At least one of a group consisting of motor oil and bunker C gas oil | 250 |
| With the selections from the groups being in a partially emulsified condition, | |
| Castor oil | 1 |
| Water | 50 |

5. That method of forming a larvacidal composition which consists in mixing by weight 1,000 parts of kerosene and 250 parts of at least one of the group consisting of water gas tar, tar acid oil and light creosote oil under the influence of heat, adding thereto 250 parts of at least one of the group consisting of motor oil and bunker C gas oil while continuing the heat and stirring, adding to the stirred mixture 1 part of castor oil and continuing the stirring and heating, melting 500 parts of pine rosin and adding the foregoing mixture thereto, stirring and heating the mass, dissolving 100 parts of sodium hydroxide in 50 parts of water, stopping the heating of the mass, adding to the mass the solution of sodium hydroxide and heating and stirring the entire mixture, and cooling the entire mixture while stirring the same.

WALTER D. MARTIN.